United States Patent [19]

van der Hulst et al.

[11] Patent Number: 4,477,589
[45] Date of Patent: Oct. 16, 1984

[54] CATALYSTS FOR THE POLYMERIZATION OF EPOXIDES AND PROCESS FOR THE PREPARATION OF SUCH CATALYSTS

[75] Inventors: Harm van der Hulst; George A. Pogany; Jan Kuyper, all of Amsterdam, Netherlands

[73] Assignee: Shell Oil Company, Houston, Tex.

[21] Appl. No.: 475,018

[22] Filed: Mar. 14, 1983

[30] Foreign Application Priority Data

Mar. 31, 1982 [GB] United Kingdom ................ 8209419

[51] Int. Cl.$^3$ ............................................. B01J 31/02
[52] U.S. Cl. ..................................... 502/169; 502/150; 502/165; 502/166; 502/167; 502/168; 502/171; 502/172; 502/200; 528/409; 528/410; 528/412; 528/415
[58] Field of Search ............... 502/169, 165, 167, 166, 502/168, 171, 172, 200, 150

[56] References Cited

U.S. PATENT DOCUMENTS 3,404,109 10/1968 Milgrom ......................... 502/167 X
3,427,256 2/1969 Milgrom ......................... 502/169 X
4,394,298 7/1983 Nowack et al. ..................... 502/200

*Primary Examiner*—Patrick Garvin
*Attorney, Agent, or Firm*—Ronald R. Reper

[57] ABSTRACT

Compounds according to formula:

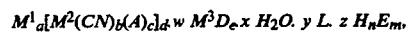

$$M^1{}_a[M^2(CN)_b(A)_c]_d \cdot w\ M^3D_e \cdot x\ H_2O \cdot y\ L \cdot z\ H_nE_m,$$

wherein $M^1$ represents at least one of Zn(II), Fe(II), Co(II), Ni(ii), Mn(II), Cu(II), Sn(II), or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, D and E each represent an anion which may be the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HE, and w is a number between 0.1 and 4;
x is a number up to 20;
y is a number between 0.1 and 6, and
z is a number between 0.1 and 5, are novel and can be used as catalysts, preferably together with an initiator in the preparation of polyether alcohols and polyether polyols. The catalyst/initiator suspensions appear to be very stable.

14 Claims, No Drawings

CATALYSTS FOR THE POLYMERIZATION OF EPOXIDES AND PROCESS FOR THE PREPARATION OF SUCH CATALYSTS

BACKGROUND OF THE INVENTION

The present invention relates to novel catalysts for the polymerization of epoxides, to the preparation of such catalysts as well as to process for the polymerization of epoxides using novel catalysts according to the present invention.

The polymerization of epoxides such as propylene oxide or mixtures of propylene oxide and ethylene oxide using water and/or alcohols as initiators is of great industrial importance since the resulting polyether alcohols or polyether polyols are very versatile compounds which can be used as such or as intermediates in the manufacture of various products such as (flexible) polyurethanes, detergents, oil additives and brake fluids.

The polymerization of epoxides is normally carried out under basic conditions, i.e. by using potassium hydroxide or sodium hydroxide as a catalyst. Although products (polyether polyols or polyether alcohols) of good quality can be obtained, the use of these inorganic bases limits the capacity of the process since a long batch time is required to warrent good quality products. Shortening of the batch time is not impossible but it has the intrinsic disadvantage that the selectivity of the process is decreased substantially, which seriously affects the product properties.

Therefore, alternative catalytic systems allowing in principle a shorter batch time have already been proposed in the art. Reference is made in this respect to double metal cyanide complexes such as are disclosed in British Patent Specification No. 1,149,726 (for instance zinc hexacyanometallate complexes also containing zinc chloride, water and an organic ligand) and in East German Patent Specification No. 148,957 (specificcally metal hexacyano-iridium complexes also containing zinc chloride, water and an ether). The preparation of such double metal cyanide complexes is rather complicated and tedious. Moreover, the preparation will be normally carried out via the intermediate free acid which could cause great problems in upscaling, not only from an equipment point of view (ion-exchange columns are required) but also from a safety point of view (potential release of hydrogen cyanide). In particular, filtration and/or centrifugation problems already severe in small-scale operations would make a full-scale operation unecomonical. It is therefore of great importance to develop a catalytic system which can be prepared without the preparative drawbacks referred to hereinbefore whilst maintaining the intrinsic advantages of the double metal cyanide-type complexes.

A novel class of double metal cyanide-type compounds has now been found which surprisingly can be prepared without any of the major handling problems referred to hereinbefore. This class of novel double metal cyanide-type compounds further appears to be very stable, both as such and in admixture with the appropriate initiator, which makes these compounds also attractive from a storage/usage point of view.

SUMMARY OF THE INVENTION

The present invention thus relates to novel double metal cyanide-type compounds according to the general formula:

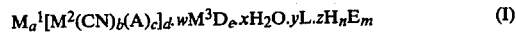

$$M_a^1[M^2(CN)_b(A)_c]_d \cdot wM^3D_e \cdot xH_2O \cdot yL \cdot zH_nE_m \quad (I)$$

wherein $M^1$ represents at least one of Zn(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, D and E each represent an anion which may be the same or different; L represents an alcohol, aldehyde, acetone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HE, and w is a number between 0.1 and 4;
x is a number up to 20;
y is a number between 0.1 and 6, and
z is a number between 0.1 and 5.

The present invention further relates to a process for the preparation of polymers selected from polyether alcohols and polyether glycols which comprises polymerizing at least on epoxide compound in the presence of at least one compound according to the general formula I as catalyst.

The present invention further relates to novel zinc hexacyano cobaltates according to the general formula:

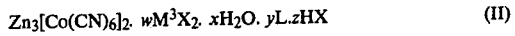

$$Zn_3[Co(CN)_6]_2 \cdot wM^3X_2 \cdot xH_2O \cdot yL \cdot zHX \quad (II)$$

wherein X represents a halide; $M^3$ represents Zn(II), Co(II) or Fe(II); L represents an alcohol, ether or ester and w is a number between 0.7 and 1.5;
x is a number between 2 and 10;
y is a number between 1.5 and 3, and
z is a number between 0.15 and 1.5.

The present invention further relates to a process for the preparation of novel catalysts according to the general formula I, in particular novel zinc hexacyanocobaltate complexes according to the general formula II. The catalysts can be prepared by reacting a compound according to the general formula:

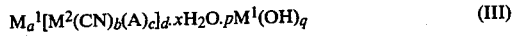

$$M_a^1[M^2(CN)_b(A)_c]_d \cdot xH_2O \cdot pM^1(OH)_q \quad (III)$$

wherein $M^1$, $M^2$, A, a, b, c, d and x are as defined hereinbefore; p is a number between 0.1 and 4 and q is an integer satisfying the valency state of $M^1$, with more than the amount stoichiometrically required for converting the hydroxyl groups present of a compound $H_nE_m$, wherein E, n and m are as defined hereinbefore, preferably in the presence of water and/or an organic ligand L as defined hereinbefore, if desired after a heat treatment. It should be noted that the groups M in formula III may represent different metals.

DESCRIPTION OF PREFERRED EMBODIMENT

The present invention relates in particular to double metal cyanide-type compounds according to the general formula I wherein $M^1$ represents at least one of Zn(II), Fe(II), Co(II), or Mn(II); $M^2$ represents at least one of Fe(II), Fe(III), Co(III), Mn(III), Ir(III), Rh(III) or Ru(II); $M^3$ represents $M^1$ or $M^2$; a and d are as defined hereinbefore; b=6 and c=0; anion D represents a halogen ion; anion E represents an anion of a strong acid; L represents an alcohol, ether or ester; e, n and m are as defined hereinbefore and w is a number between 0.5 and 3;
x is a number between 2 and 14;
y is a number between 1 and 4, and
z is a number between 0.1 and 2.

The present invention further relates to novel zinc hexacyano cobaltates according to the general formula:

$$Zn_3[Co(CN)_6]_2 \cdot wM^3X_2 \cdot xH_2O \cdot YL \cdot zHX \quad (II)$$

wherein X represents a halide; $M^3$ represents Zn(II), Co(II) or Fe(II); L represents an alcohol, ether or ester and w is a number between 0.7 and 1.5;
x is a number between 2 and 10;
y is a number between 1.5 and 3, and
z is a number between 0.15 and 1.5.

As referred to hereinabove the organic compound L can be an alcohol, aldehyde, ketone, ether, ester, amide, nitrile or sulphide. Examples of alcohols include lower alcohols such as methanol, ethanol, propanol, isopropanol and butanol. Higher alcohols as well as alcohols containing aromatic rings can also be used. Examples of aldehydes include formaldehyde, acetaldehyde, butyraldehyde, pivalaldehyde, glyoxal, benzaldehyde and cinnamic aldehyde. Examples of ketones include acetone, methyl ethyl ketone, methyl isobutyl ketone, diethyl ketone and cyclohexanone.

Examples of ethers include monoethers, diethers and polyethers as well as cyclic ethers such as dimethyl ether, diethyl ether, dibutyl ether, methyl t-butyl ether, bis-(beta-methoxy ethyl) ether, ethylene glycol dimethyl ether, triethylene glycol dimethyl ether, dimethoxy methane, diethoxy methane, acetal, trimethylol propane trimethyl ether, dioxane, trioxyethylene and paraldehyde. Preference is given to the use of acyclic ethers, in particular acyclic diethers such as dimethoxy ethane (ethylene glycol dimethyl ether). Also hydroxy ethers such as ethylene glycol monomethyl ether and related compounds can be used conveniently.

Examples of esters include methyl formate, ethyl formate isopropyl formate, methyl acetate, ethyl acetate, propyl acetate, ethylene glycol diacetate and triethylene glycol diacetate. Examples of amides include formamide, acetamide, propionamide, valeramide as well as urea and derivatives thereof. Examples of nitriles include acetonitrile, propionitrile and valeronitrile. Examples of sulphides include dimethyl sulphide, diethyl sulphide and ethyl butyl sulphide. Also mixtures of two or more organic compounds can be applied.

The acids according to the general formula $H_nE_m$ which are present in the double metal cyanides according the general formula I comprise in particular those which are capable of reacting with bases according to the general formula $M^1(OH)_q$ as defined hereinafter. Examples of such acids include hydrochloric acid, hydrobromic acid, hydroiodic acid, nitric acid, sulphuric acid, phosphoric acid, (per)chloric acid, carboxylic acids such as acetic acid and benzoic acid, halogen-substituted carboxylic acids such as trichloro acetic acid and trifluoro acetic acid, alkyl sulphonic acids and aryl sulphonic acids such as methane sulphonic acid and para-toluene sulphonic acid. Preference is given to the hydrogen halides and sulphuric acid, and particularly hydrogen chloride and hydrogen bromide. Mixtures of acids can also be used suitably.

The present invention further relates to a process for the preparation of novel catalysts according to the general formula I, in particular novel zinc hexacyanobaltate complexes according to the general formula II. The catalysts can be prepared by reacting a compound according to the general formula:

$$M_a^1[M^2(CN)_b(A)_c]_d \cdot xH_2O \cdot pM^1(OH)_q \quad (III)$$

wherein $M^1$, $M^2$, A, a, b, c, d and x are defined hereinbefore; p is a number between 0.1 and 4 and q is an integer satisfying the valency state of $M^1$, with more than the amount stoichiometrically required for converting the hydroxyl groups present of a compound $H_nE_m$, wherein H, E, n and m are as defined hereinbefore, preferably in the presence of water and/or an organic ligand L as defined hereinbefore, if desired after a heat treatment. I should be noted that the groups M in formula III may represent different metals.

The present invention relates in particular to the preparation of zinc hexacyanocobaltate complexes according to the general formula II by reacting compounds according to the general formula:

$$Zn_3[Co(CN)_6]_2 \cdot xH_2O \cdot pZn(OH)_2 \quad (IV)$$

wherein x and p are as defined hereinbefore with more than the amount stoichiometrically required for converting the hydroxyl groups present of an inorganic acid $H_nX_m$ wherein X, n and m are as defined hereinbefore, preferably in the presence of water and/or an appropriate organic ligand as defined hereinbefore, if desired after a heat treatment.

It should be noted that by using more than the amount of the compound $H_nE_m$ required stoichiometrically to convert the hydroxyl groups present in compounds according to the general formula III a catalyst will be obtained which contains a certain amount of $H_nE_m$. It has been found that the presence of this compound has a marked influence on the viscosity of the catalyst complex suspension, both in the presence and in the absence of an initiator, which greatly facilitates handling procedures.

A molar excess of the compound $H_nE_m$ (or $H_nX_m$) of up to 5 times the amount necessary to convert the double metal cyanide-metal hydroxide complex can be used conveniently. Good results have been obtained using hydrogen halide (X=Cl or br and n and m are 1), in a 1-2 molar excess. This normally results in a compound according to the general formula I wherein z ranges between 0.1 and 1.5.

The preparation of the catalyst is normally carried out by suspending a compound according to the general formula III or IV, if desired after a heat treatment, in a mixture $H_2O/L$ or in pure L. Good results have been obtained using dimethoxyethane as the organic compound, but other ligands can also be used. When mixtures of water and an appropriate organic compound are used, preference is given to mixtures comprising more than 50 %w, and particularly between 60 and 85 %w of organic compound.

The compound $H_nE_m$ can be added as such, or as a solution of the appropriate acid in the concentration desired, in a convenient solvent. Normally, the amount of acid desired is introduced in water and/or a compound L with stirring into the suspension of the double metal cyanide-metal hydroxide complex. The reaction mixture obtained is normally stirred for a number of hours. Without any filtration or centrifugation after evaporation of volatile compounds a solid containing $H_nE_m$ is obtained which can be used as such or which can be stored. The suspension obtained may also be mixed with an appropriate initiator and used as such or after removal of at least part of the volatile compounds. Initiator-catalyst suspensions thus prepared are stable for at least half a year at room temperature. The use of non-volatite acids such as sulphuric acid is advantageous in that they reduce the viscosity of the resulting suspension, which facilitates its handling.

The compounds according to the general formula III or IV may be subjected to heat treatment during or after preparation, prior to reacting them with a compound $H_nE_m$ in the presence of water and/or an organic compound L. Without wishing to be bound to any particular theory it would appear that the double metal cyanide-metal hydroxide complex is converted into a double metal cyanide hydroxide complex.

It should be noted that such double metal cyanide-hydroxide complexes can also be obtained by reacting solid double metal cyanide (or a hydrate thereof) with $M^1(OH)_q$, preferably in suspension, followed by a heat treatment.

The heat treatment will normally be carried out a temperatures between 40° C. and 120° C., preferably between 50° C. and 90° C. The treatment is particularly effective when the double metal cyanide-metal hydroxide complex has been obtained starting from alkali hexacyano metallates since the alkali halide co-produced can be removed quite easily, e.g. by an extremely rapid filtration or decantation without undue incorporation into the final catalyst. This is important since alkali ions, in particular sodium and potassium ions act as catalyst poison in polymerization reactions of epoxides using double metal cyanide-type catalysts. Moreover, the product obtained after drying is easily reduced to a free-flowing powder which can be handled easily.

The compounds according to the general formula III and IV which act as starting materials in the process for the preparation of the novel catalysts according to the present invention can be prepared by various methods. A convenient method comprises the use of easily accessible and preferably commercially available polycyano metallates. Focussing for the sake of simplicity on the preparation of zinc hexacyano cobaltate-type catalysts (but other catalysts can of course be prepared according to similar procedures) a suitable method comprises the addition of an alkali(ne earth) hexacyano cobaltate to an aqueous solution of an appropriate zinc salt, such as zinc chloride or zinc sulphate using such an amount thereof that the subsequent addition of a base, preferably an alkali(ne earth) metal hydroxide or ammonium hydroxide causes the formation of the desired metal hydroxide complex.

Starting materials which can be used conveniently include potassium hexacyano ferrate, sodium hexacyano ferrate, calcium hexacyano ferrate, lithium hexacyano cobaltate, potassium hexacyano cobaltate, sodium hexacyano cobaltate, calcium hexacyano cobaltate, barium hexacyano cobaltate, magnesium hexacyano cobaltate, aluminum hexacyano cobaltate, potassium hexacyano iridate, sodium hexacyano iridate and barium hexacyano iridate. Preference is given to the use of hexacyano cobaltates, in particular sodium or potassium hexacyano cobaltate. If desired, the alkali(ne earth) metal hexacyano metallates may be subjected to an ion-exchange treatment to give the corresponding acids which in their turn can be reacted with an appropriate metal salt according to the general formula $M^3D_e$ wherein $M^3$, D and e are as defined hereinbefore. In order to minimize the possible inclusion of alkali metal ions into the catalyst, it is preferred to use rather low concentrations of the reactants, an excess of the compound $M^3D_e$, whilst maintaining also a high stirring rate.

After the initial conversion of the starting alkali(ne earth) hexacyano metallate into the double metal cyanide using a $M^1$ salt, preferably an excess of a $M^1$ chloride or sulphate, the product obtained is treated with an amount of a compound $M^3D_e$, in particular a zinc, cobalt or iron salt, preferably zinc chloride or zinc sulphate, and an appropriate amount of a base, preferably an inorganic base so as to obtain a compound according to the general formula III. Preferably, the amount of inorganic base used is equivalent to or slightly less than the amount necessary to convert the excess of $M^1$ salt together with the amount of $M^3D_e$. The inorganic base enhances the filterability of the reaction product and contributes to the free-flowing properties of the solid.

When compounds according to the general formula III are to be prepared wherein $M^1=M^3=Zn$, a preferred method comprises the addition of the starting alkali(ne earth) hexacyano metallate to an excess of the zinc salt, if desired together with the appropriate amount of the inorganic base. The order of addition is less critical when the reaction product is submitted to a heat treatment. It has been found that good results can be obtained when the compound $M^3D_e$ is used in such an amount that a molar ratio $M_a^1[M^2(CN)_b(A)_c]_d$:$M^3D_e$ between 0.1 and 4, preferably between 0.7 and 1.5, is obtained in the catalyst according to the general formula I.

The present invention further relates to a process for the polymerization of epoxides into polyether alcohols or polyether polyols by using one or more catalysts according to the general formula I. Examples of epoxides comprise 1,2-epoxides and 1,3-epoxides (oxetanes) such as ethylene oxide, 1,2-propylene oxide, epichlorohydrin, 1,2-butene oxide, 4-chloro-1,2-butene oxide, 1,2-hexene oxide, 1,2-dodecene oxide, isobutylene oxide, styrene oxide, 1,2-pentene oxide, isopentene oxide, 1,2-heptene oxide, methyl glycidyl ether, ethyl glycidyl ether, allyl glycidyl ether, phenyl glycidyl ether, butadiene monoxide, isoprene monoxide, 1,3-propylene oxide, tolyl glycidyl ether, 3,3-dimethyl oxetane and 3-vinyl-3-methyl oxetane. Preference is given to the use of lower alkylene oxides such as ethylene oxide, 1,2-propylene oxide, butylene oxide, butadiene monoxide, methyl glycidyl ether and phenyl glycidyl ether, and particularly 1,2-propylene oxide. Mixtures of epoxides, in particular mixtures of propylene oxide and other epoxides, such as ethylene oxide can also be applied. If desired, the epoxide(s) may be added to the reaction mixture in more than one stage. The amounts of the various epoxides to be used can vary widely according to specific end use and can be easily determined by those skilled in the art.

Preference is given to the use of at least one or more initiators in the process for the polymerization of epoxides according to the present invention. As stated hereinbefore, at least part of the initiator may already be present in the catalyst suspension to be applied because of the unusual stability of the catalyst/initiator suspension containing one or more compounds according to the general formula I. It is of course also possible to add the appropriate amount of an initiator to a solid catalyst or a catalyst suspension prior to the reaction or to add a solid catalyst or a catalyst suspension to one or more epoxides or an epoxide(s)/initiator mixture.

Examples of initiators which can be suitably applied comprise: water, alkanols such as methanol, ethanol, propanol, butanol and hexanol, thiols such as butane thiol, glycols such as propylene glycol and polypropylene glycol, glycol monoalkyl ethers such as mono (m)ethoxy ethylene glycol, aromatic hydroxy compounds such as phenol, the cresols and diphenylol propane, trimethylol propane, pentaerythritol, carboxylic acids or anhydrides such as fumaric acid, maleic acid and phthalic acid as well as the corresponding low-molecular weight alkoxylated products, e.g. compounds having a molecular weight between 200 and 2000, preferably based on propylene oxide and a lower polyalkanol such as glycol or glycerol, i.e. a propoxylated glycerol.

Therefore, the present invention also relates to catalyst suspensions containing at least a compound according to the general formula I and preferably at least one initiator. The present invention relates in particular to catalyst suspensions containing at least a compound according to the general formula II and preferably at least one initiator, which is preferably a polyalkanol.

The molar ratio of epoxide(s) and initiator applied is not very critical and may vary between wide limits. Good results can be obtained using a molar ratio in the range between 3000 and 0.5, calculated as number of moles of epoxide(s) per hydroxyl group. Preference is given to the use of molar ratios in the range between 60 and 10, calculated as number of moles of epoxide(s) per hydroxyl group.

The amount of catalyst used in the process for the polymerization of epoxides according to the present invention is not very critical and may vary between wide limits. Suitably the amount of catalyst is within the range of from 0.02 to 15% by weight of the initiator applied, and preferable within the range of 0.1 to 5% by weight thereof.

The polymerization of epoxides using a catalyst according to the general formula I, optionally in the presence of an initiator, can be carried out using methods described in the literature. Temperatures between 20° and 180° C., preferably between 80° and 140° C., are suitably employed, while pressures up to 10 bar or more may be used. The use of higher temperatures is advantageous in that it increases the reactivity without significantly reducing the selectivity. The amount of epoxide(s) to be used in the process according to the present invention is usually selected so as to be sufficient for the formation of a polyether polyol, or a mixture thereof, having the desired molecular weight and functionality as determined by the initiator.

After the reaction has reached the desired stage the polyether alcohols or polyether polyols formed may be collected without further treatment or, if desired, purified, e.g. by treatment with active carbon or natural or synthetic absorbent earths, followed by filtration. It will be clear that numerous other substances may be added, before, during and/or after the reaction.

The polyether polyols obtained can be further modified by methods known to those skilled in the art, e.g. producing either an OH— or isocyanate terminated prepolymer by reacting them with the appropriate amount of (poly)isocyanate, or producing polymer polyols, or producing a more reactive polyol by modifying the end groups of the polyol to primary OH— or NH—groups.

Polyether polyols obtained in the process according to the present invention whether or not containing catalyst residues show a high reactivity with respect to isocyanates and are particularly suitable for the production of flexible polyurethanes in accordance with the general methods described in the literature. For instance, the polyether polyols, possibly admixed with other active hydrogen-atoms-containing compounds, can be reacted conveniently with organic polyisocyanates such as toluene diisocyanate or methylene diisocyanate, if desired in the presence of other substances, such as foaming agents, surface-active agents, antioxidants flame-retarding agents and other aditives known in the art.

In accordance with the above, the present invention also relates to polyether alcohols and/or polyether polyols manufactured by the process as described hereinbefore, the production of polyurethanes by reacting said polyether polyols with (poly)isocyanates, and (poly)urethanes so produced.

The invention is illustrated by the following Examples.

EXAMPLE I a. Preparation of Catalysts

A mixture of 100 ml of a solution of 44.2 g $K_3Co(CN)_6$ (ex Alfa Inorganics) in 283 g water and 100 ml water was added dropwise to a well-stirred solution of 40.8 g zinc chloride in 430 ml $H_2O$ in a 2-liter round-bottom flask, followed by the gradual addition of 200 ml of the potassium hexacyano cobaltate solution together with 500 ml $H_2O$. In addition, a solution of 5.3 g sodium hydroxide in 400 ml $H_2O$ was added dropwise to the reaction mixture obtained. After the additions a white precipitate was obtained which contained $Zn_3[Co(CN)_6]_2 \cdot 12-14\ H_2O$ and $Zn(OH)_2$ in a 1:1 molar ratio. After filtration the wet cake obtained was reslurried in water. This was repeated several times. A suspension of the final wet cake (233 g) and 1,2-dimethoxyethane (DME) was obtained by adding 646 g DME and stirring until completely suspended (suspension A). To a sample of 163 g of this suspension A were added under stirring 4.4 ml concentrated HCl, 4 ml $H_2O$ and 25 ml DME. A sample of 11.6 g of this reaction mixture was set aside to allow evaporation of volatile components. A solid residue of 0.74 g catalyst was obtained, corresponding with a suspension concentration of 6.3 %w. The solid residue was analysed and the results corresponded well with the formula:

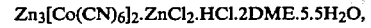
$$Zn_3[Co(CN)_6]_2 \cdot ZnCl_2 \cdot HCl \cdot 2DME \cdot 5.5H_2O,$$

the analytical data (elemental analysis) being as follows (calculated values in brackets):
Zn=23.9% (24.3%)
Co=11.2% (10.9%)
Cl=9.5% (9.8%)
N=15.2% (15.6%)
C=21.9% (22.3%)
H=2.9% (2.9%)

Another part of the reaction mixture of suspension A with HCl, $H_2O$ and DME (95.6 g) was mixed with 159.3 g of a propoxylated glycerol having an average molecular weight of about 300 in a rotating evaporator. Subsequently the rotating evaporator was evacuated resulting in the removal of 89.4 g volatiles. The resulting catalyst suspension B in the propoxylated glycerol contained 3.7 %w of catalyst. This suspension was stable and active for at least half a year as was checked with a polymerization experiment.

Other catalysts were prepared from suspension A by reacting 155 g of suspension A with 2.1 ml concentrated HCl in a mixture of 4 ml H₂O and 25 ml DME yielding a catalyst containing 0.6 mole HCl per mole of catalyst and by reacting 165.4 g of suspension A with 3.1 ml of concentrated HCl in a mixture of 4 ml H₂O and 20 ml DME yielding a catalyst containing 0.75 mole HCl per mole of catalyst.

b. Polymerization

The polymerization experiment was carried out in a 2.5 liter reactor provided with means of agitation and heat exchange. The reactor was flushed with nitrogen and charged with 156 g of a propoxylated glycerol having an average molecular weight of 300 and 8.7 g of the catalyst suspension B corresponding with 0.32 g catalyst prepared as described hereinbefore. The reactor was evacuated at 90° C. for a few minutes and flushed again with nitrogen. About two moles of a mixture of propylene oxide and ethylene oxide (containing 11 %w of ethylene oxide) was pumped into the reactor and the temperature was increased to 95° C. After an induction period of about 10 minutes the reaction started, as was observed from heat evolution and pressure drop. After most of the initial epoxide mixture had reacted away, a mixture of propylene oxide and ethylene oxide (containing 11%w of ethylene oxide) was fed to the reactor in such a way as to maintain a pressure of 3 bar while the temperature was increased to 110°-120° C. The addition was continued until the rate of reaction dropped to less than 1/10 of the maximum. If and when necessary, part of the reactor content can be discharged so as to allow space for more epoxide. Polyether polyol was obtained in a yield, calculated per gramme of catalyst, of 7.6 kg.

EXAMPLE II

A solution of 22.1 g potassium hexacyano cobaltate and 2.7 g sodium hydroxide in 170 g water was prepared (solution A). A second solution of 22 g zinc chloride in 260 ml water was prepared in a 1.5 liter round-bottom flask and this solution was well stirred during the addition thereto of solution A. This addition was carried out gradually using several portions of the solution A which had been diluted with twice the amount of water. After the addition had been completed, the precipitate of the zinc hexacyano cobaltate and zinc hydroxide was collected on a filter. The wet cake was reslurried in 1 liter H₂O, stirred for a few hours and filtered. This was repeated several times. The final wet cake (112 g) was mixed with 160 ml DME with rapid stirring until all of the cake had gone into the suspension. Subsequently, a mixture of 8.2 ml concentrated HCl, water (10.5 ml) and DME (53 ml) was added slowly over a few minutes. The mixture was set aside and a sample of the suspension obtained (4.8 g) was allowed evaporation of volatile components. A residue of 0.29 g catalyst was obtained, corresponding with a suspension concentration of 6%w. The dried catalyst was analysed and the results agreed well with the formula:

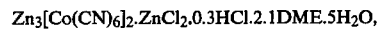

the analytical data (elemental analysis) being as follows (calculated values in brackets):
C=23.3% (23.3%)
N=15.8% (15.7%)
Cl=7.7% (7.6%)
H=3.2% (3.1%)
H₂O=8.8% (9.2%)
Na<0.02%
K=0.09%

Ten days after the addition of the mixture of HCl, H₂O and DME, 102.5 g of the resulting suspension was mixed with 155 g of a propoxylated glycerol having an average molecular weight of 300 in a rotating evaporator. After removal of about 96 g volatiles at 55° C. under reduced pressure a stable catalyst suspension was obtained containing 3.8%w of catalyst in the propoxylated glycerol.

A polymerization experiment was carried out as described in Example Ib using 157 g of the propoxylated glycerol and 8.2 g of the catalyst as described hereinabove. Polyether polyol was obtained in a yield, calculated per gramme of catalyst, of 7.6 kg.

EXAMPLE III

An industrial solution of potassium hexacyano cobaltate (110 grammes, ex Degussa, containing about 12.4%w of the salt) was diluted with water to a volume of 150 ml. This solution was added under rapid stirring to a solution of 11 grammes of zinc chloride in 150 ml H₂O. The precipitate formed was collected on a filter and the wet cake obtained was reslurred with water. This procedure was repeated several times. The final wet cake (44 g) was then mixed with DME (150 ml) and stirred until complete suspension (suspension A). To 43.5 grammes of suspension A was added a mixture of 0.6 g zinc chloride, 0.7 ml concentrated hydrochloric acid, 4 ml H₂O and 4 ml DME under stirring. After 4 days 40.6 g of this mixture was mixed with 91.8 g of a propoxylated glycerol having an average molecular weight of about 300 in a rotating evaporator. After removal of about 35 g volatiles at 55° C. under reduced pressure a stable catalyst suspension was obtained containing 3.6%w of catalyst in the propoxylated glycerol.

A polymerization experiment was carried out as described hereinbefore. Polyether polyol was obtained in a yield, calculated per gramme of catalyst, of 5.8 kg.

COMPARATIVE EXAMPLE A

A catalyst containing zinc hexacyano cobaltate, zinc chloride, water and DME but no hydrogen chloride was prepared by adding via a dropping funnel 1358 ml of an industrial sodium hexacyano cobaltate solution (ex Degussa) (0.45 mole 1⁻¹) under stirring to a concentrated solution of ZnCl₂ in water (131 g in 220 ml). A white precipitate formed almost immediately. After one hour of additional stirring the pecipitate was collected as a cake. The filtrate was recycled twice and the resulting cake was reslurried in demineralized water. This was repeated several times. An amount of 33.3 g ZnCl₂ was dissolved in a mixture of water (222 ml) and DME (444 ml). The washed cake was added to this mixture and slurried for one hour. After filtration of the mixture, which was very difficult, the resulting cake was dried to approximately 30%w H₂O. The sample was milled and dried further to about 15%w H₂O. The approximate composition of the product (obtained in 78% yield) was:

$Zn_3[Co(CN)_6]_2 \cdot ZnCl_2 \cdot 1.7DME \cdot 7.3H_2O$.

A polymerization reaction was carried out as described in Example Ib using 165 g of the propoxylated glycerol and 0.3 g of the catalyst as described hereinbefore. Polyether polyol was obtained but in a yield, calculated per gramme of catalyst, of less than 2 kg.

COMPARATIVE EXAMPLE B

The experiment as described in Example III was repeated but omitted the addition of hydrochloric acid. After 5 days 39 g of the catalyst suspension obtained was mixed with 98.1 of a propoxylated glycerol having an average molecular weight of about 300 in a rotating evaporator. After removal of volatiles a catalyst suspension was was obtained containing 3.3%w of catalyst in the propoxylated glycerol.

A polymerization experiment was carried out as described in Example III. Polyether polyol was obtained in a yield, calculated per gramme of catalyst, of 3.1 kg.

EXAMPLE IV

The complex $Zn_3[Co(CN)_6]_2 \cdot 12-14H_2O \cdot Zn(OH)_2$ was prepared according to the procedure described in Example Ia from 27.2 g $ZnCl_2$ and 33.3 g $K_3Co(CN)_6$. The filter cake obtained was mixed with water to a total weight of 150 g whereafter 150 ml DME was added. Under vigorous stirring a mixture of 12 ml concentrated HCl, $H_2O$ (50 ml) and DME (150 ml) was added. After three days a sample of the $DME/H_2O$ suspension was dried in air and the resulting catalyst was analysed. The results agreed well with the formula:

$Zn_3[Co(CN)_6]_2 \cdot ZnCl_2 \cdot 1.2HCl \cdot 2DME \cdot 7.3H_2O$, the analytical data (elemental analysis) being as follows (calculated values in brackets):
Zn=23.4% (24.0%)
Co=10.5% (10.5%)
Cl=10.2% (10.2%)
N=14.7% (15.0%)
C=21.3% (21.5%)
H=3.2% (3.2%)
$H_2O$=11.6% (11.8%).

The catalyst thus obtained can be used suitably for the preparation of polyether alcohols and polyether polyols.

EXAMPLE V

A large scale preparation of a zinc hexacyano cobaltate-zinc chloride catalyst was carried out by dissolving 14.7 mol zinc chloride in 25 kg water and adding this solution gradually to 16 kg of an aqueous solution of potassium hexacyano cobaltate (ex Degussa, containing 3 moles of this salt). The corresponding zinc hexacyano cobaltate precipitated immediately and a milky suspension resulted. A further 31 kg of an aqueous solution of potassium hexacyano cobaltate (containing 3 moles of this double salt) was added slowly to the reaction mixture. Thereafter, 15 kg of an aqueous solution of KOH (containing 6.25 moles KOH) was added to the reaction mixture which resulted in a precipitate of $Zn_3[Co(CN)_6]_2 \cdot Zn(OH)_2$. The solid mass was separated by filtration and reslurrying several times in 60 kg water so as to reduce the potassium-ion content to less than 0.1%w. The total amount of wet cake thus obtained (amounting to about 9.1 kg) was reslurried in 24 kg DME. A 4.6 kg solution of HCl, $H_2O$ and DME (containing 0.88 kg concentrated HCl, the remainder being $H_2O$ DME in a 1:2 weight ration) was added to the reslurried mixture followed by a post-reaction during which the temperature was raised to 80° C. in the final stage for about 4 hours. After removal of volatiles from a sample of this suspension a catalyst was isolated containing about 13%w water. The amount of C was 21.7%w; N 15.1%w and Cl 8%w. 21.2 kg of the suspension was mixed with 87 kg of the propoxylated glycerol referred to hereinbefore. After removal of volatiles the concentration of the catalyst suspension amounted to 2.3%w. With this catalyst polyether polyol was obtained in a yield, calculated per gramme of catalyst, of 5.9 kg. Another batch of catalyst suspension (2.7 kg) was treated with 4.6 kg of a polypropylene glycol having an average molecular weight of 400. The concentration of the catalyst in this suspension amounted to 4.2%w. With this catalyst polyether polyol was obtained in a yield, calculated per gramme of catalyst, of 5.5 kg.

EXAMPLE VI a. Preparation of Catalyst

A 1:1 mixture of $Zn_3[Co(CN)_6]_2 \cdot 12-14H_2O$ and $Zn(OH)_2$ which was prepared in situ as a suspension in water according to the experiment described in Example Ia was heated for a few minutes at 66° C. This caused a severe drop in the viscosity of the mixture, followed by a rapid sedimentation of rather large particles (about 0.5–1 micron, compared with an initial particle size of 0.05–0.1 micron). After a short settling period the suspernatant water layer was removed by decantation. The residue was washed by adding water, stirring and after settling, decantation. This washing procedure was done several times. The final residue was dried in air. This gave a free flowing powder in which the original participants, zinc hexacyano cobaltate and zinc hydroxide, could not be detected as such with infrared and X-ray spectroscopy. Based on elemental analytical data and infrared spectroscopic data the solid was assigned the formula $Zn_2[Co(CN)_6](OH) \cdot H_2O$. The potassium content of this solid was surprisingly low (<0.01%w) compared with the potassium content present in the solid isolated from the suspension prepared according to Example Ia when no heat treatment was applied (0.08–0.12%w).

10 Grammes $Zn_2[Co(CN)_6](OH) \cdot H_2O$ was suspended in 44 g DME and a mixture of 6.2 g concentrated hydrochloric acid and 10.8 g water was added. After seven days 30 grammes of the obtained suspension of the catalyst in DME/water was mixed with 139 g of a propoxylated glycerol, having an average molecular weight of about 300, in a rotating evaporator. After removal of 24.2 grammes of volatiles the resulting suspension contained 4.0% catalyst.

b. Polymerizations

A polymerization experiment carried out under the conditions described in Example Ib gave a polyether polyol in a yield, calculated per gramme of catalyst, of 8.3 kg.

A different polymerization experiment was carried out using 100 mg of the catalyst suspension described hereinbefore mixed with 6.5 g butanol-2 and 67 ml toluene. This mixture was sucked in an evacuated small (250 ml) steel autoclave followed by 110 ml propylene oxide. The autoclave (not equipped with internal cooling) was put in an oil bath heated at 90° C. After 2 hours the content of the autoclave was transferred to a rotating evaporator and volatiles were removed under vacuum at 90° C. The residual polyether alcohol weighed 45 g, which corresponds with a yield, calculated per gramme catalyst, of 11.2 kg.

c. Accelerated Preparation of Catalyst

In stead of preparing the compound $Zn_2[Co(CN)_6](OH)\cdot H_2O$ by decantation (Example VIa), the compound was isolated by filtration. The filtration was found to occur extremely rapidly compared with the filtration of the unheated suspension. After the addition of DME, the resulting suspension of $Zn_2[Co(CN)_6](OH)$ in DME was heated to 40° C. prior to the addition of hydrochloric acid. The suspension was then mixed with a propoxylated glycerol having an average molecular weight of about 300 and volatiles were removed under vacuum. The total preparation time of the final catalyst suspension in the propoxylated glycerol (starting from the $K_3Co(CN)_6$ and $ZnCl_2$ solutions) did not exceed 8 hours. In a polymerization experiment a similar yield of polyether polyol was obtained.

COMPARATIVE EXAMPLE C a. Preparation of Catalyst

A catalyst suspension in $DME/H_2O$ was prepared according to the experiment described in Example VIa. The suspension was centrifugated and the supernatant liquid obtained was removed by decantation. The residual cake was suspended in fresh DME, this suspension was again centrifugated and the supernatant liquid decantated. This process was repeated several times to remove hydrochloric acid. Finally, the cake was suspended in DME and water was added under stirring in such an amount that the final weight ration $DME:H_2O$ amounted to about 3:1. From this catalyst suspension in $DME/H_2O$ a suspension in a propoxylated glycerol was prepared as described in Example VI.

b. Polymerization

A polymerization experiment was carried out under the conditions described in Example Ib (at a temperature of 105° C. and keeping the pressure of the propylene oxide/ethylene oxide mixture at 2 bar) using 0.33 g catalyst, a yield, calculated per gramme of catalyst, of only 3.9 kg was obtained.

EXAMPLE VII a. Preparation of Catalyst

A suspension of zinc hexacyano cobaltate and zinc hydroxide in a ~1.1 molar ratio was prepared in a mixture of DME and water as described in Example Ia (16.5 g $K_3Co(CN)_6$, 17.2 g $ZnCl_2$ and 2 g NaOH were used). To this stirred suspension a mixture of 18.2 g concentrated hydrochloric acid and 18 g water were added. After stirring overnight the reaction mixture was heated at 80° C. for 3 hours. 61 Grammes of the final reaction mixture were sucked to dryness under reduced pressure (25°-30° C.; about 1 mm Hg pressure) leaving 3.9 g of solid catalyst. The results corresponded well with the formula:

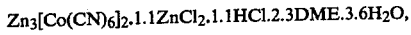

the analytical data (elemental analysis) being as follows (calculated values in brackets):

Zn=24.9% (24.5%)
Co=10.5% (10.8%)
Cl=10.8% (10.7%)
N=15.1% (15.3%)
C=23.3% (23.2%)
H=2.8% (2.8%)

b. Polymerizations 4.75 mg of this solid catalyst which had been stored at room temperature for half a year was put in a small (250 ml) steel autoclave. After evacuation the autoclave was charged with 4.1 g butanol-2, 64 g toluene and 106 ml propylene oxide. The autoclave was put in a heating bath at 90° C. whilst the mixture inside the autoclave was stirred. After 40 minutes the temperature was raised to 100° C. over a period of 20 minutes. The autoclave was then cooled with water and opened. The content was transferred to a rotating evaporator and volatiles were removed under reduced pressure at 90° C. The residual polyether alcohol obtained weighed 48 g, which corresponds with a yield, calculated per gramme of catalyst, of 10.1 kg. A further polymerization experiment was carried using 2.3 mg of the solid catalyst. After evacuation the autoclave was charged with a mixture of 75 ml toluene and 100 ml propylene oxide. The mixture in the autoclave was stirred with a magnetic stirrer at 26°-28° C. during a period of 72 hours. The content of the autoclave was transferred to a rotating evaporator and volatiles were removed under reduced pressure at 90° C. The residual polyether alcohol, which had a rubbery appearance, weighed 24 g, which corresponds with a yield, calculated per gramme of catalyst, of 10.4 kg.

EXAMPLE VIII

A part of the polyether polyol made according to the experiment described in Example III was used, after only stripping and filtration, for the product of polyurethane foam. For comparison, a polyether polyol having the same functionality and OH-value was prepared according to the classical KOH-catalysed process.

Both samples were mixed with the same amount of catalyst, blowing agents and surfactant and reacted with isocyanate at 107 index available under the trade name CARADATE-80. The reactivities of the two systems as measured by cream times, rise times and gel times were identical within the usual experimental error. The cell structures and densities of the foams thus prepared were also indistinguishable.

We claim:

1. Compounds according to the general formula:

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, D and E each represent an anion which may be the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HE, and w is a number between 0.1 and 4;
x is a number up to 20;
y is a number between 0.1 and 6, and
z is a number between 0.1 and 5.

2. Compounds according to claim 1, wherein $M^1$ represents at least one of Zn(II), Fe(II), Co(II), or Mn(II); $M^2$ represents at least one of Fe(II), Fe(III), Co(III), Mn(III), Ir(III), Rh(III) or Ru(II); $M^3$ represents $M^1$ or $M^2$; a and d are as defined hereinbefore; b=6 and c=0; D represents a halogen ion; E represents an anion of a strong acid; L represents an alcohol, ether or ester; e, n and m are as defined hereinbefore and w is a number between 0.5 and 3;
x is a number between 2 and 14;
y is a number between 1 and 4, and
z is a number between 0.1 and 2.

3. Compounds according to the general formula I according to claim 1, as represented by the general formula:

$$Zn_3[Co(CN)_6]_2 \cdot wM^3X_2 \cdot xH_2O \cdot yL \cdot zHX \quad (II)$$

wherein X represents a halide; $M^3$ represents Zn(II), Co(II) or Fe(II); L represents an alcohol, ether or ester and w is a number between 0.7 and 1.5;
x is a number between 2 and 10
y is a number between 1.5 and 3, and
z is a number between 0.15 and 1.5.

4. Compounds according to claim 1, wherein L represents an ether.

5. Compounds according to claim 1, wherein an acid $H_nE_m$ is present which is capable of reacting with bases according to the general formula $M^1(OH)_q$, wherein q is an integer satisfying the valency state of $M^1$.

6. Compounds according to claim 5, wherein the compound $H_nE_m$ is selected from the group consisting of a hydrogen halide and sulfuric acid.

7. Process for the preparation of compounds according to the general formula I in claim 1, which comprises reacting a compound according to the general formula:

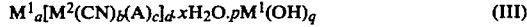

$$M^1_a[M^2(CN)_b(A)_c]_d \cdot xH_2O \cdot pM^1(OH)_q \quad (III)$$

wherein $M^1$, $M^2$, A, a, b, c, d and x are as defined in said claim 1; p is a number between 0.1 and 4 and q is an integer satisfying the valency state of $M^1$, with more than the amount stoichiometrically required for converting the hydroxyl groups present of a compound $H_nE_m$, wherein E, n and m are as defined in said claim 1.

8. Process according to claim 7, which comprises reacting a compound according to the the general formula:

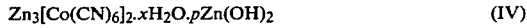

$$Zn_3[Co(CN)_6]_2 \cdot xH_2O \cdot pZn(OH)_2 \quad (IV)$$

with more than the amount stoichiometrically required for converting the hydroxyl groups present of an inorganic acid $H_nX_m$ wherein X represents halide, in the presence of at least one of water and of an organic compound selected from the group consisting of an alcohol, aldehyde, ketone, ether, ester, amide, nitrile, sulfide and mixtures thereof.

9. Process according to claim 7, wherein use is made of a molar excess of the compound $H_nE_m$ of up to 5 times the amount necessary to convert the double metal cyanide-metal hydroxide complex to be neutralized.

10. Process according to claim 7, wherein the compound according to the general formula III is subjected to a heat treatment during or after its preparation prior to reaction with a compound $H_nE_m$ in the presence of water and an organic compound L.

11. Process according to claim 10, wherein the heat treatment is carried out at a temperature between 40° C. and 120° C.

12. Process according to claim 7, wherein use is made of compounds according to the general formula III, which have been obtained by reacting a compound $M_a{}^1[Co(CN)_b(A)_c]_d$ and a compound $M^3D_e$, in a molar ratio between 0.1 and 4.

13. Catalyst suspension comprising at least one compound according to the general formula:

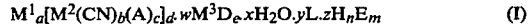

$$M^1_a[M^2(CN)_b(A)_c]_d \cdot wM^3D_e \cdot xH_2O \cdot yL \cdot zH_nE_m \quad (I)$$

wherein $M^1$ represents at least one of Zn(II), Fe(II), Co(II), Ni(II), Mn(II), Cu(II), Sn(II), or Ph(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, D and E each represent an anion which may be the same or different; L represents an alcohol, aldehyde, ketone, ether, ester, amide, nitrile or sulphide or mixtures thereof; a and d are numbers to satisfy the valency state of $M^1$ and $M^2$ in the double metal cyanide part of the general formula I; b and c and integers (b>c) which together with a and d provide the electroneutrality of the double metal cyanide part of the general formula I; e is an integer satisying the valency state of $M^3$; n and m are integers satisfying the electroneutrality of HE, and w is a number between 0.1 and 4;
x is a number up to 20;
y is a number between 0.1 and 6, and
z is a number between 0.1 and 5, and at least one initiator for the polymerization of epoxides in a liquid selected from the group consisting of water and an organic compound selected from an alcohol, aldehyde, ketone, ether, ester, amide, nitrile, sulfide and mixtures thereof.

14. Catalyst suspensions according to claim 13, containing at least one compound according to the general formula:

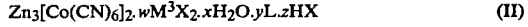

$$Zn_3[Co(CN)_6]_2 \cdot wM^3X_2 \cdot xH_2O \cdot yL \cdot zHX \quad (II)$$

wherein X represents a halide; $M^3$ represents Zn(II), Co(II), or Fe(II); L represents an alcohol, ether or ester and w is a number between 0.7 and 1.5;
x is a number between 2 and 10;
y is a number between 1.5 and 3, and
z is a number between 0.15 and 1.5, and a propoxylated glycerol having a molecular weight between 200 and 2000.

* * * * *